United States Patent [19]
Magill et al.

[11] Patent Number: 5,668,795
[45] Date of Patent: Sep. 16, 1997

[54] MODULATION SYSTEM FOR SPREAD SPECTRUM CDMA COMMUNICTION

[75] Inventors: David T. Magill, Palo Alto; Herman A. Bustamante, Millbrae, both of Calif.; Francis D. Natali, Pt. Townsend, Wash.

[73] Assignee: Stanford Telecommunications, Inc., Sunnyvale, Calif.

[21] Appl. No.: 470,540

[22] Filed: Jun. 6, 1995

[51] Int. Cl.$^6$ .................. H04B 7/216; H04J 13/00
[52] U.S. Cl. .................. 370/209; 370/320; 370/441; 370/479; 375/200; 375/280; 375/282
[58] Field of Search .................. 370/18, 19, 20, 370/21, 22, 208, 209, 320, 441, 479; 375/200, 205, 206, 269, 279, 280, 281, 282, 298, 308, 329

[56] References Cited

U.S. PATENT DOCUMENTS

| | | | |
|---|---|---|---|
| 5,103,459 | 4/1992 | Gilhousen et al. | 375/205 |
| 5,204,876 | 4/1993 | Bruckert et al. | 375/200 |
| 5,414,728 | 5/1995 | Zehavi | 375/200 |
| 5,461,639 | 10/1995 | Wheatley, III et al. | 375/205 |

*Primary Examiner*—Hassan Kizou
*Attorney, Agent, or Firm*—Jim Zegeer, Esq.

[57] ABSTRACT

The OCDMA waveform of the present invention uses bi-phase PN modulation (BPSK PN chip modulation) in conjunction with MPSK or MQASK data modulation (QPSK data modulation is one preferred embodiment) to increase bandwidth efficiency. The number of orthogonal users that can be placed on a single carrier is equal to, at most, the length of the orthogonal binary sequence. The Radamacher-Walsh (RW) sequence chip rate must be $4^n$ times the symbol rate (where n is a positive integer) since the symbol transitions must be synchronized to the RW period to guarantee orthogonality of the multiple users when data transitions are present. The symbol rate for QPSK modulation is one-half that for BPSK modulation. As a result, twice as many orthogonal functions are available for a given clock rate for QPSK as for BPSK modulation. That is, an OCDMA system with QPSK data can support twice as many users in a given bandwidth as an OCDMA system with BPSK data.

9 Claims, 4 Drawing Sheets

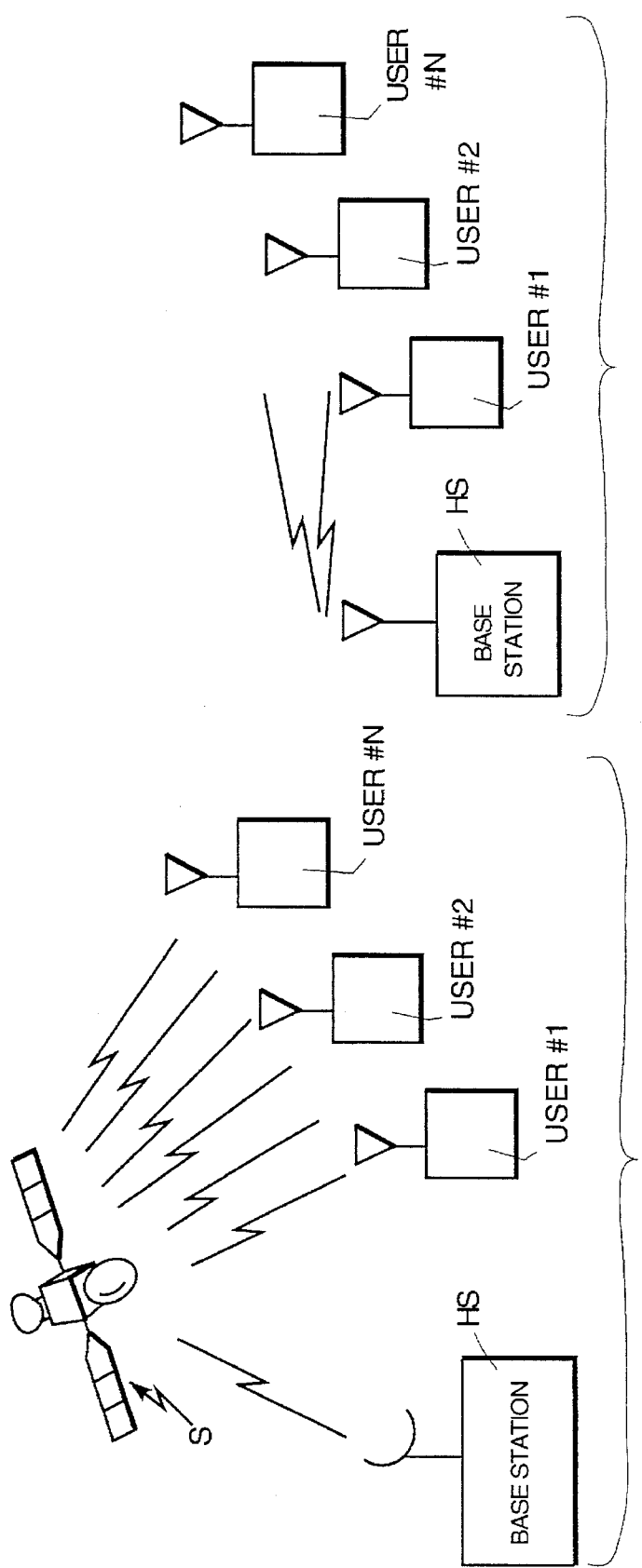
FIG. 1a
FIG. 1b
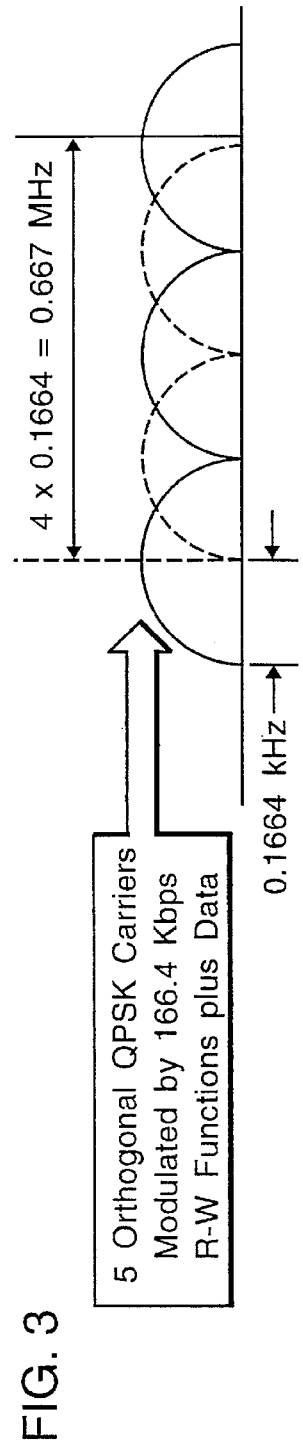
FIG. 3

MODULATION SYSTEM FOR SPREAD SPECTRUM CDMA COMMUNICTION

REFERENCE TO RELATED APPLICATIONS

This application is related to Natali et al application Ser. No. 08/257,324 filed Jun. 7, 1994, now U.S. Pat. No. 5,570,349, entitled WIRELESS DIRECT SEQUENCE SPREAD SPECTRUM DIGITAL CELLULAR TELEPHONE SYSTEM, Ser. No. 07/980,957 filed Nov. 24, 1992, now U.S. Pat. No. 5,375,140, and a continuation of application Ser. No. 08/454,663 filed May 31, 1995 for MODULATION SYSTEM FOR SPREAD SPECTRUM CDMA COMMUNICATION, all incorporated herein by reference.

BACKGROUND AND BRIEF DESCRIPTION OF THE PRIOR ART

Spread spectrum CDMA communications is presently being used for a number of commercial applications and is expected to proliferate as the demand for untethered communications increases. One example of this art is the IS-95 standard which exists for cellular telephony. In this case, the base station of this star configured network transmits a set of orthogonal Walsh functions which are overlaid with a pseudo-noise (PN) sequence. Each orthogonal function carries voice or data for a single user. See M. J. E. Golay, IDA Report 108, Pg. 110 (1965) which discloses this basic signal format. Also see Magill et al. "Spread Spectrum Technology for Commercial Applications", IEEE, June 1994, incorporated herein by reference.

It is well known that direct sequence spread spectrum CDMA systems frequently use either bi-phase PN modulation and bi-phase shift keyed (BPSK) data modulation as in the GPS system, or quadraphase (QPSK) PN modulation and BPSK data as in the IS-95 cellular telephone standard. Also see Gilhousen et al. U.S. Pat. No. 5,103,459. This is because the use of a higher order data modulation such as QPSK would make the system more complex without any bandwidth improvement or increase in processing gain.

The object of the present invention is to provide an orthogonal code division multiple access (OCDMA) communication system having an improved modulation system providing increased bandwidth efficiency.

BRIEF DESCRIPTION OF THE INVENTION

The OCDMA waveform of the present invention uses bi-phase shift key PN modulation (BPSK chip modulation) in conjunction with QPSK data modulation in a preferred embodiment. The reason for this modulation format and waveform is the increased bandwidth efficiency. The number of orthogonal users that can be placed on a single carrier is equal to, at most, the length of the orthogonal binary sequence. For example, there are $4^n$ Rademacher-Walsh (RW) functions of length $4^n$ where n is a positive integer. Most commonly RW functions of length $2^n$ are used since they are somewhat easier to implement than sequences of length $4^n$. Note that sequences of length $2^n$ are included as a special case of sequences of length $4^n$, e.g., RW functions exist for any length $4^n$ which includes the more commonly used $2^n$ as a subset. This implies that the RW sequence chip rate must be $4^n$ times the symbol rate since the symbol transitions must be synchronized to the RW period to guarantee orthogonality of the multiple users when data transitions are present. Note that the symbol rate for QPSK modulation is one-half that for BPSK modulation. As a result, twice as many orthogonal functions are available for a given clock rate for QPSK as for BPSK modulation. That is, an OCDMA system with QPSK data can support twice as many users in a given bandwidth as an OCDMA system with BPSK data.

In fact, one could use 8PSK data modulation and support three times as many users as BPSK as long as the additional complexity and performance degradation were acceptable. This invention can, of course, be extended to even higher order modulations and is applicable to terrestrial and satellite communication systems. MPSK modulation tends to be the preferred higher order modulation format for satellite communication links owing to the fact that all constellation points have the same signal strength leading to a low peak-to-average power ratio. In terrestrial applications less importance is placed on the peak-to-average power ratio and M-ary quadrature-amplitude shift keying (QASK) modulation is preferred. For a given bandwidth efficiency QASK places the signal constellation points farther apart and, thus, requires less for a given symbol error rate. In practice, for PSK one rarely considers M>16 while commonly M-ary QASK or MQASK uses M as large as 64 or larger. Note that quaternary PSK (or QPSK) can be either regarded as MPSK or MQASK with M=4.

For those situations in which power is relatively abundant and it is easy to achieve a high signal-to-noise ratio it is desirable to use a large value of M since this offers a high bandwidth efficiency. In this case, M-ary QASK is the preferred modulation format. In other cases where power is less plentiful and peak-to-average power ratio is important MPSK is preferred.

DESCRIPTION OF THE DRAWINGS

The above and other objects, advantages and features of the invention will become more apparent when considered with the following specification and accompanying drawings wherein:

FIG. 1A is a block diagram of a satellite based OCDMA communication system incorporating the invention, FIG. 1B is a block diagram of a terrestrial based OCDMA communication system incorporating the invention, FIG. 3 is a diagram illustrating the resulting received spectrum where the chipping rate is 166.4 KHz and using five orthogonal carriers.

DETAILED DESCRIPTION OF THE INVENTION

As discussed above, this invention is directed to a modulation system for OCDMA communication and is based on the disclosure in the above-referenced related application and patent. As indicated in FIGS. 1A and 1B, the invention is applicable to satellite and terrestrial OCDMA systems. In FIG. 1A, the hub or base station HS communicates with the users USER#1, USER#2 . . . USER#N, via satellite S and, in FIG. 1B, the hub or base station B is in a star configuration and communicates directly with the user stations. Typically, the user stations are lower power handsets.

Figure 2:
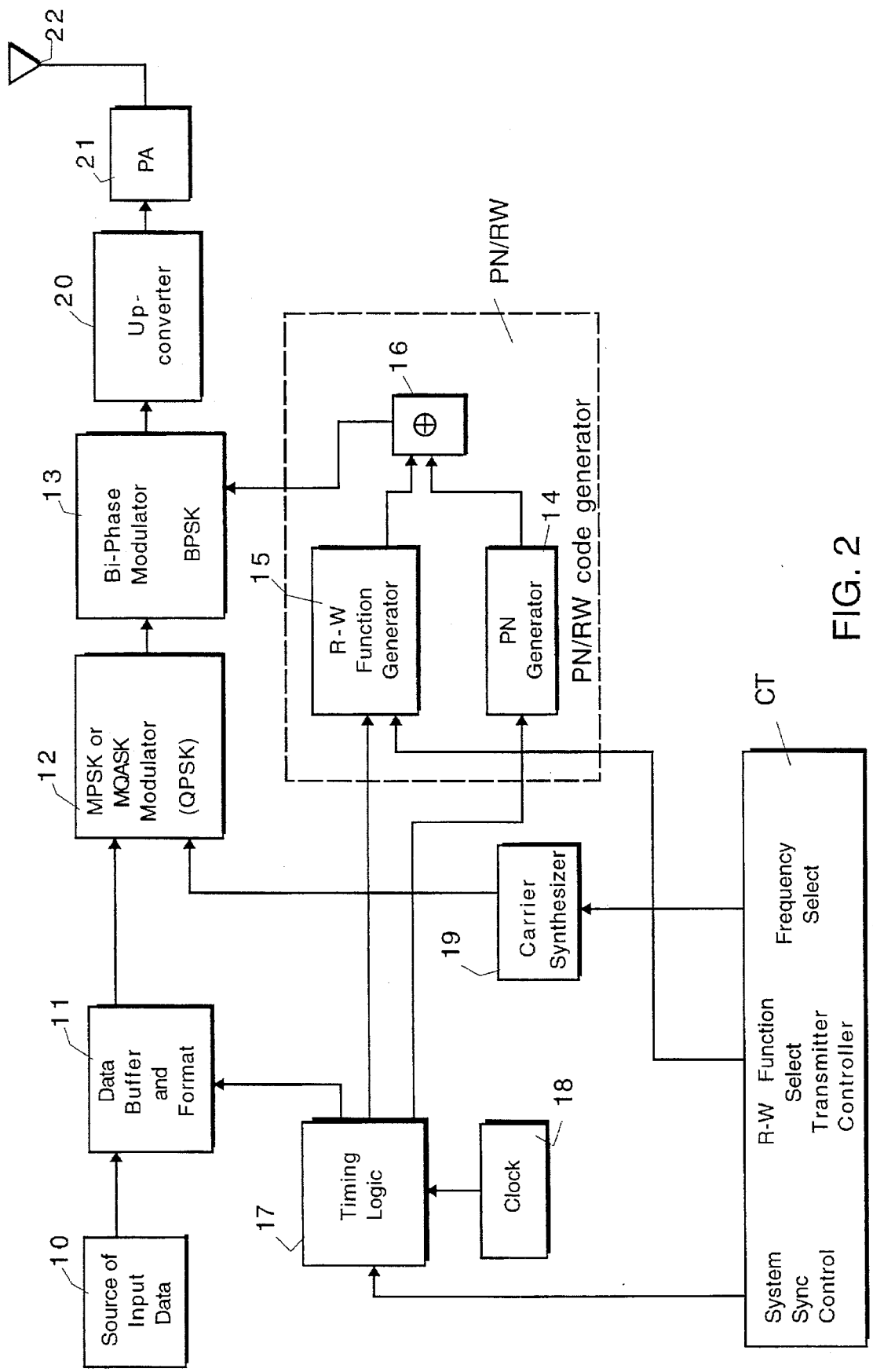
FIG. 2 is a block diagram of a transmitter of an OCDMA communication system incorporating the invention.

An embodiment of the transmitter is shown in FIG. 2. The input data from source 10 is buffered and formatted in 11 and then is modulated on a carrier using MPSK modulation in 12, where M is 4, 8, etc. In the preferred embodiment, one would use M=4, i.e. QPSK modulation. Forward Error Correction (FEC) coding and interleaving may also be employed, depending on the application.

The signal is then BPSK modulated in 13 with a binary sequence which is the Mod-2 sum 16 of a PN sequence from PN generator 14 and one member of a set of binary sequences which are orthogonal over a symbol period. The Radamacher-Walsh (RW) functions in 15, for which there are $2^n$ orthogonal functions of length $2^n$ where n is a positive integer, will be used for illustrative purposes. The RW sequence chip rate must be $2^n$ times the symbol rate so the symbol transitions are synchronized to the RW period to guarantee orthogonality of the multiple users when data transitions are present. An RW function select signal from controller C selects the desired member of the set of RW sequences for Mod-2 summing with the selected PN code.

The same PN code is employed by each of the members of a single "cell" or orthogonal set. The PN clock rate from timing logic circuit 17, which is driven by clock 18, is usually selected to be the same as the RW chip rate, although this is not necessary.

A system synchronizing signal to timing logic circuit 17 and a frequency select signal to conventional carrier synthesizer 19. The signal waveform from BPSK modulator 13 is up-converted 20, power amplified 21 and broadcast by antenna 22.

As mentioned above, each user is assigned a code which is orthogonal to all of the other user codes (i.e. the orthogonal codes have a cross-correlation value of zero with each other). Further, the orthogonal code period is chosen such that the code repeats an integer number of times (usually once) in a data symbol time. The code epoch is synchronized with the symbol transitions so that no data transitions occur within the code. Note that the RW chipping rate is equal to the maximum number of orthogonal users times the symbol rate.

In this embodiment, the modulated carrier frequency is selected from one of N frequencies which are orthogonal over a RW chip interval, i.e. the carrier frequencies are spaced by the RW chipping rate. The composite signal is up-converted to the appropriate frequency band for transmission.

The individual transmissions are synchronized to arrive at the base station in time and frequency synchronism. The resulting received spectrum is as shown in FIG. 3 for the case where the chipping rate is 166.4 kHz and five orthogonal carriers are employed.

Figure 4:
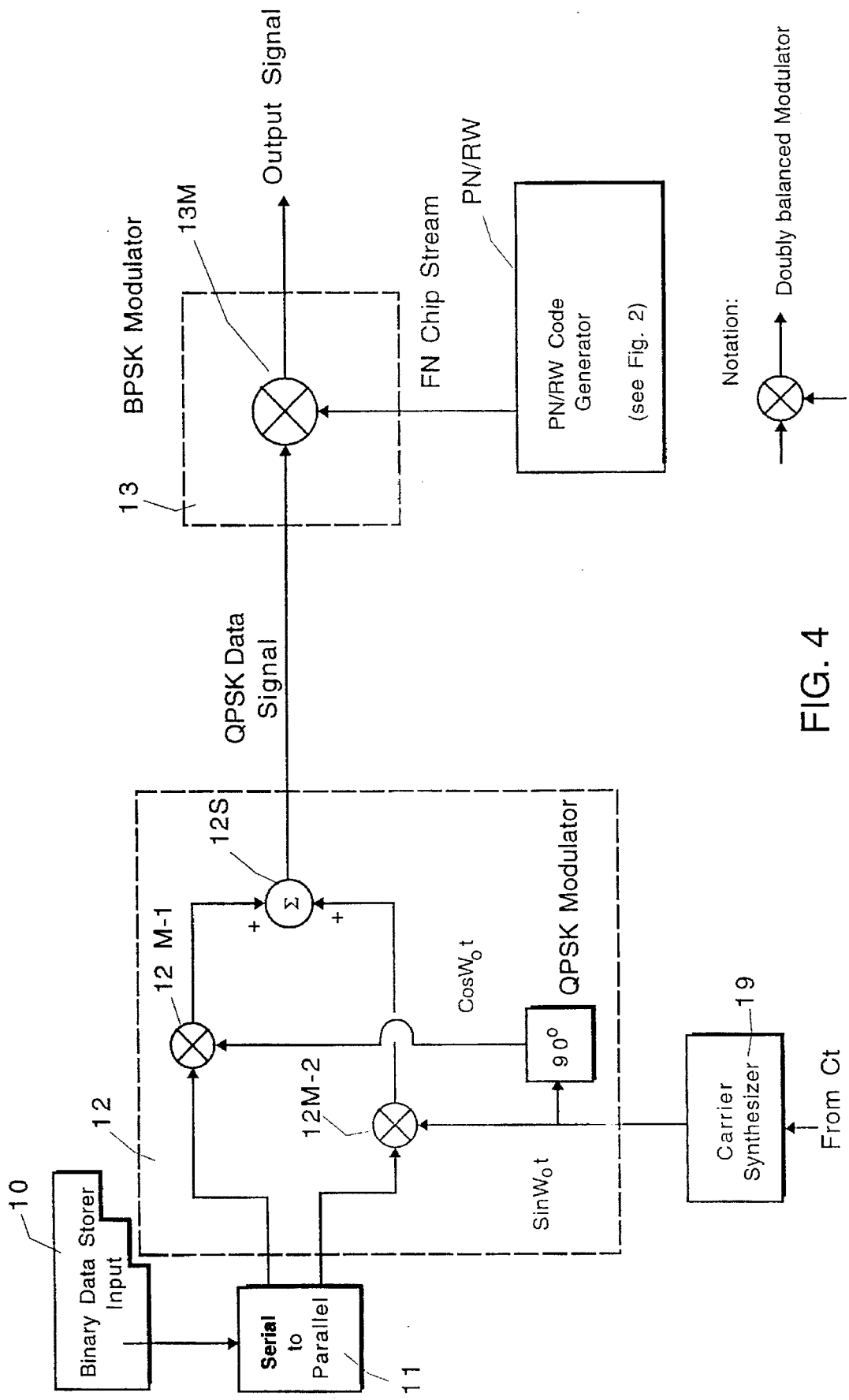
FIG. 4 is a block diagram of a modulator incorporating the invention.

Modulators 12 and 13 are shown in FIG. 4. The input data stream from source 10 is buffered, formatted and converted from serial to parallel in converter 11 and these signals are supplied to a pair of doubly balanced modulators 12m-1 and 12m-2. As is conventional, modulator 12m-1 receives the carrier(sin_wt) from synthesizer 19 and modulator 12m-2 receives the quadrature (90 degree phase shifted) carrier (cos-wt) as second inputs, respectively. The outputs are summed in summer 12s which outputs the QPSK data signal to a further doubly balanced modulator 13m. The binary sequence constituted by the Mod-2 sum of the selected PN sequence and a selected RW member from PN/RW code generator PN/RW (enclosed in dashed lines in FIG. 2).

Figure 5:
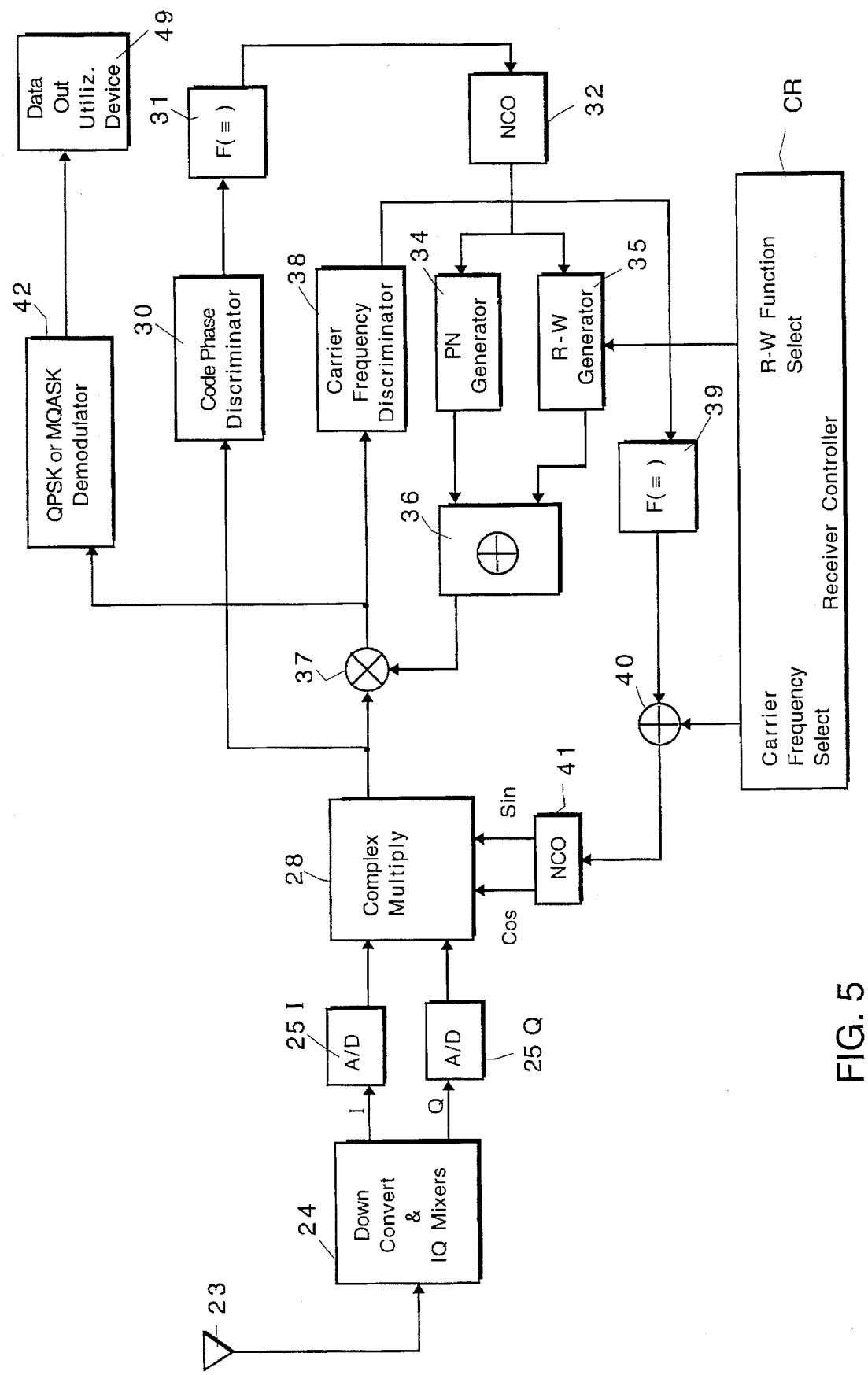
FIG. 5 is a functional block diagram of a receiver having a demodulator system incorporating the invention.

A block diagram of the OCDMA receiver is shown in FIG. 5. The signals received on antenna 23 are down converted 24 to I,Q baseband and converted from analog to digital samples 25I, 25Q for processing. Tracking loops are employed to estimate received carrier frequency and code phase. The code phase tracking loop includes code phase discriminator 30, filter 31, number controlled oscillator 32, which controls PN generator 34 and RW generator 35 which generate the respective PN and RW functions. Receiver controller CR provides an RW select signal to RW generator 35 to select a particular RW function and a PN select signal to PN generator 34 to select a particular PN function. The PN and RW functions are combined 36 and applied to mixer 37. The carrier tracking loop incorporates a carrier frequency discriminator 38, filter 39. The carrier frequency select from receiver controller CR is selected 40, the carrier frequency via number controller oscillator 41. The quadrative (cos, sin) signals from NCO 41 are applied to complex multiplier 28 to close the carrier tracking loop. QPSK demodulation 42 is performed in the usual way employing either coherent or differentially coherent detection to provide the data to a utilization device 43.

Summarizing, the invention provides an OCDMA communication system in which there is QPSK data modulation and BPSK PN chip modulation. This improves bandwidth efficiency because QPSK data modulation permits twice the data rate in the same bandwidth as BPSK data modulation. While QPSK PN chip modulation is more complex than BPSK PN chip modulation, it reduces the impact of non-linear (that is, efficient) power amplification on raising the power spectrum side lobes. The preferred embodiment of this invention uses the simpler BPSK PN chip modulation.

While preferred embodiments of the invention have been shown and illustrated, it will be appreciated that other embodiments will be readily apparent to those skilled in the art and be encompassed by the claims appended hereto.

What is claimed is:

1. A method of increasing the bandwidth efficiency of an orthogonal code division multiple access (OCDMA) radio communication system in which a set of orthogonal functions are overlaid with a pseudo-noise (PN) signal forming a coded spreading sequence for an information signal, each of the orthogonal functions of a set carries voice/data signals for a single user on the system and a carrier signal is selected from a source of carrier signals, comprising:

MPSK modulating said voice/data signals on said carrier signal to form a transmit signal, M being selected from 4, 8, 16, and BPSK modulating said coded spreading sequence on said transmit signal.

2. The method defined in claim 1 wherein M=4.

3. The method defined in claim 1 wherein M is 16.

4. The method defined in claim 1 wherein said orthogonal functions are selected from a set of orthogonal Rademacher-Walsh (RW) functions which are overlaid with said pseudo-noise (PN) sequence forming said coded spreading sequence.

5. The method defined in claim 4 wherein said voice/data has a data symbol rate and said RW function has an RW chip rate, further characterized by said RW chip rate being $2^N$ times the data symbol rate where "N" is a positive integer.

6. The method defined in claim 4 wherein said voice/data has a data symbol rate and said RW functions have an RW chip rate, characterized by said RW chip rate being $4^N$ times the data symbol rate where "N" is a positive integer.

7. The method defined in any one of claims 1–6 wherein said radio communication system includes a plurality of receivers, said method including at each receiver, despreading any received spread spectrum OCDMA signal and thereby recovering said transmit signal and demodulating said transmit signal to recover said voice/data signals.

8. A method of doubling the number of users in a given bandwidth of an orthogonal code division multiple access (OCDMA) radio communication system in which a set of orthogonal functions are overlaid with a pseudo-noise (PN) sequence forming a coded spreading sequence for an information signal, each orthogonal function carries voice/data for a single user on the system and a carrier signal is selected from a source of carrier signals, comprising:

QPSK modulating said voice/data signals on said carrier to form a transmit signal and, BPSK modulating said coded spreading sequence on said transmit signal.

9. The method defined in claim 8 wherein said orthogonal function is selected from a set of orthogonal Rademacher-Walsh (RW) functions which are overlaid with said pseudo-noise (PN) sequence forming said coded spreading sequence.

* * * * *

UNITED STATES PATENT AND TRADEMARK OFFICE
CERTIFICATE OF CORRECTION

PATENT NO. : 5,668,795
APPLICATION NO. : 08/470540
DATED : September 16, 1997
INVENTOR(S) : Magill et al.

It is certified that error appears in the above-identified patent and that said Letters Patent is hereby corrected as shown below:

This application is a continuation of Application No. 08/454,663 filed May 31, 1995 now U.S. Patent 5,687,166, which is a continuation-in-part of Application No. 07/980,957 filed November 24, 1992 now U.S. Patent 5,375,140 and Application No. 08/257,324 filed June 7, 1994 now U.S. Patent 5,570,349.

Signed and Sealed this

Fourth Day of September, 2007

JON W. DUDAS
*Director of the United States Patent and Trademark Office*